Figure 1D:
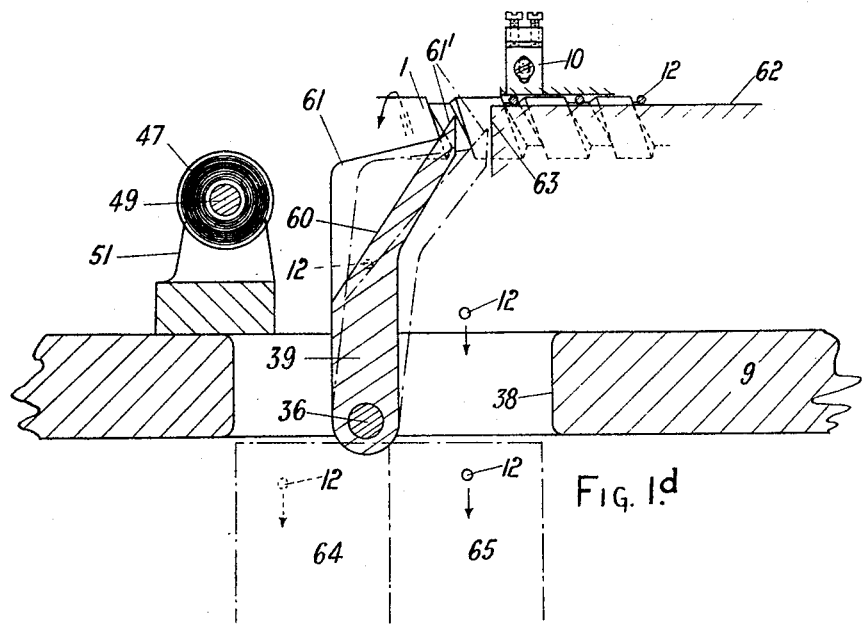

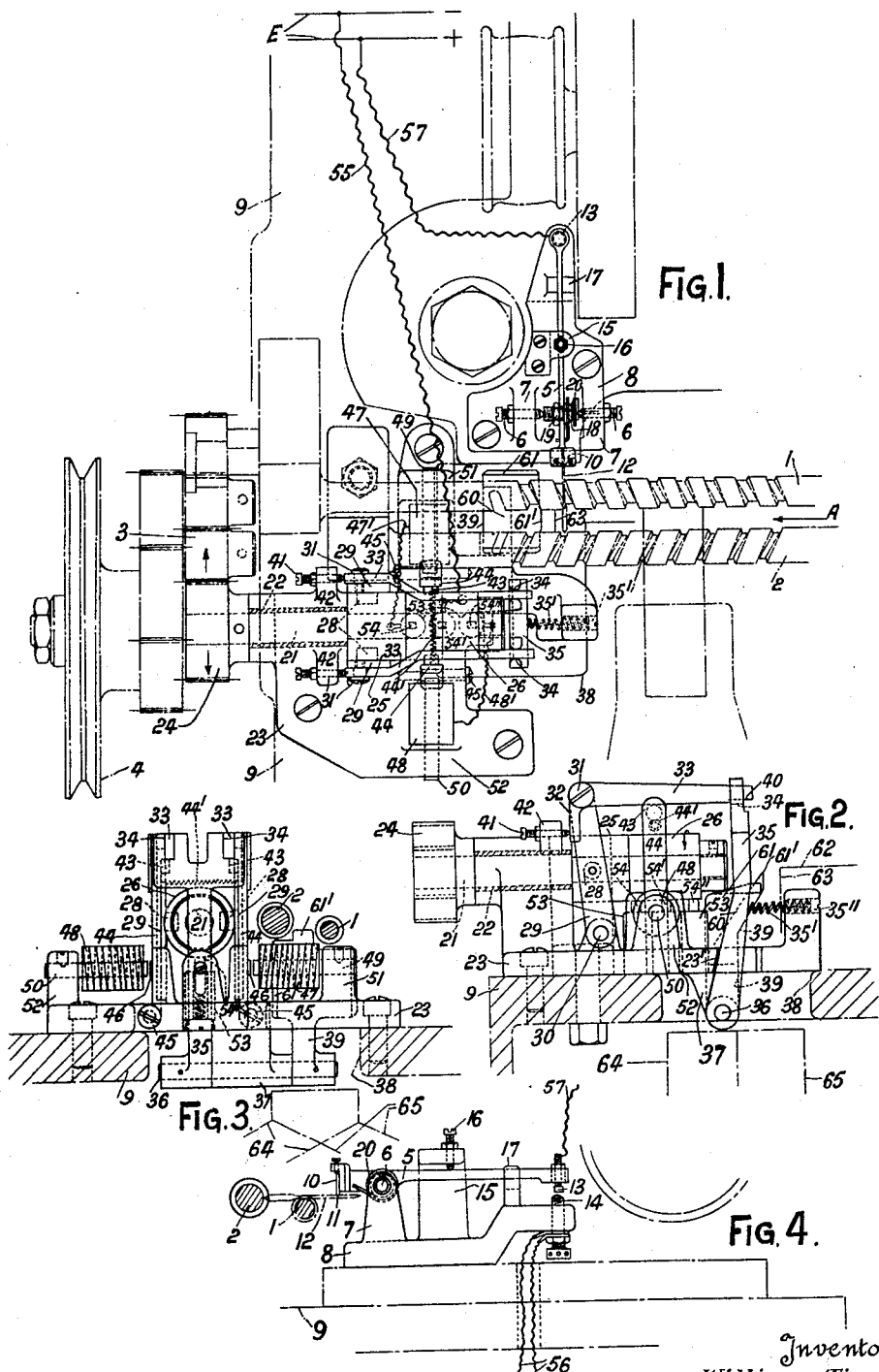

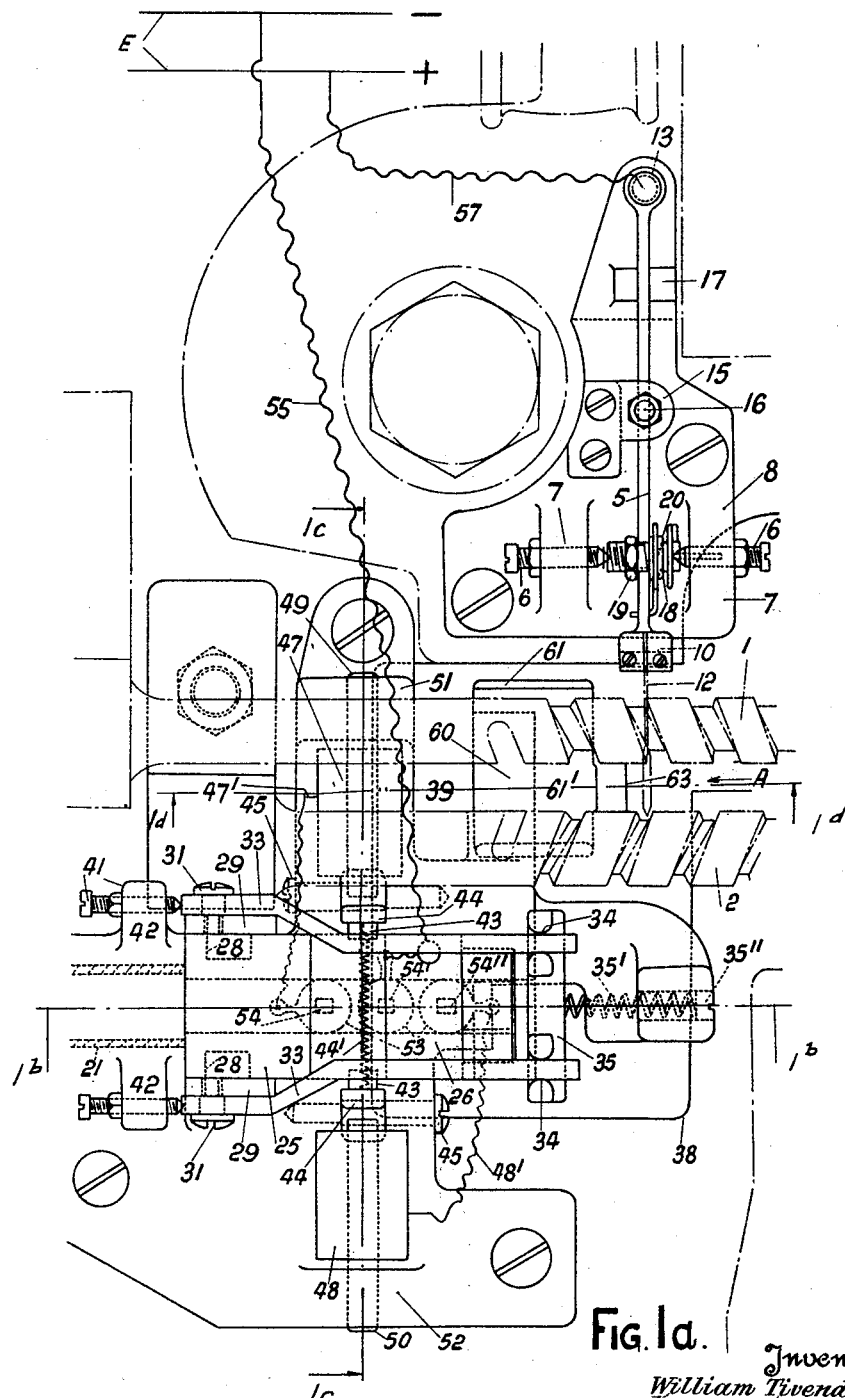

May 9, 1933.   W. TIVENDALE ET AL   1,908,197
DEVICE FOR SORTING NEEDLES AND THE LIKE
Filed March 5, 1929    6 Sheets-Sheet 3
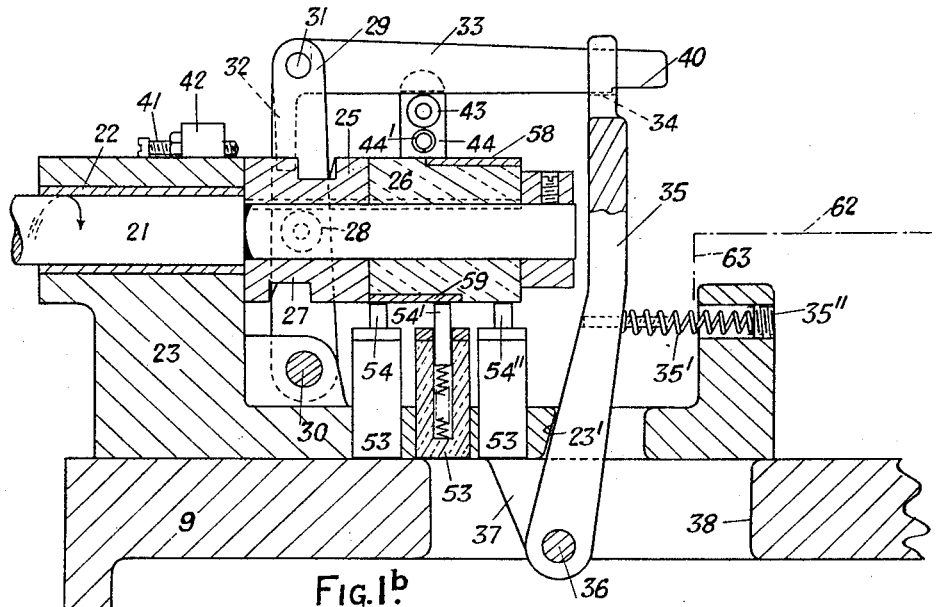
Fig. 1ᵇ
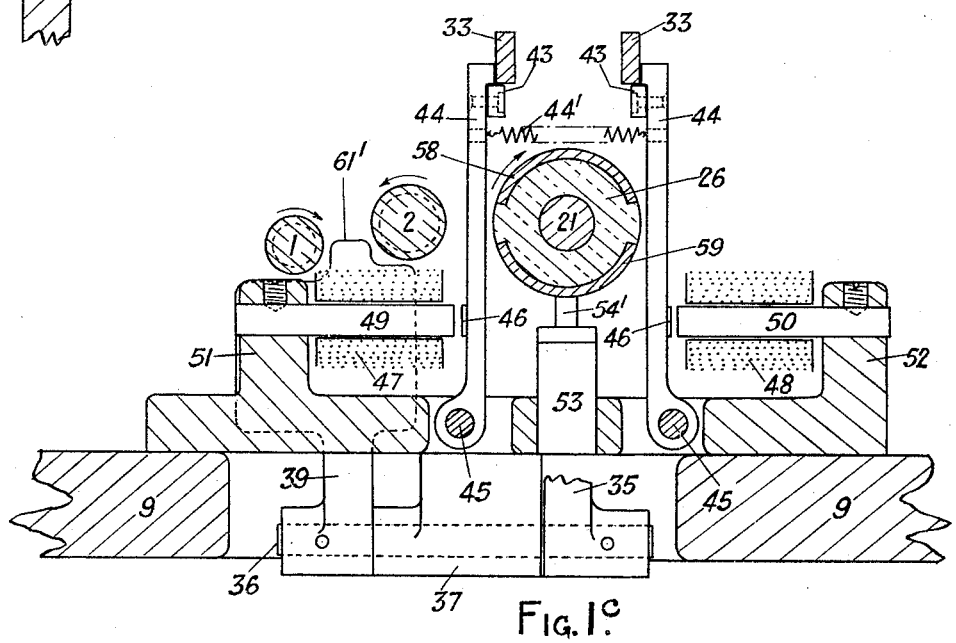
Fig. 1ᶜ
Inventors
William Tivendale and
James Baxter
By Henry J. Miller
Attorney

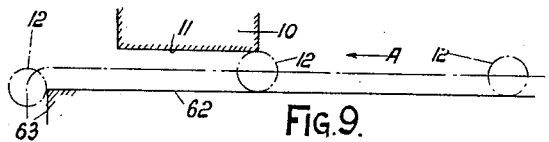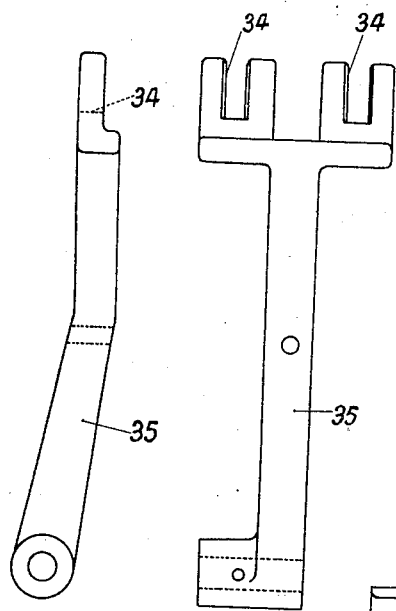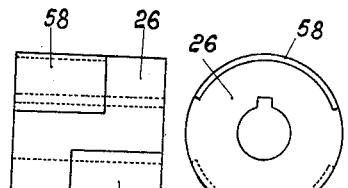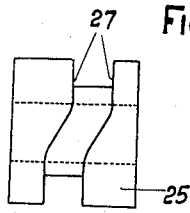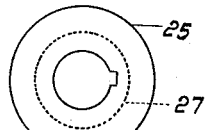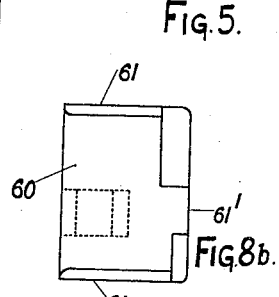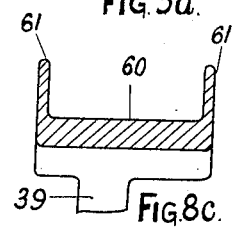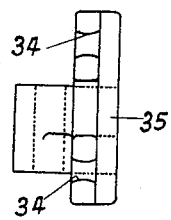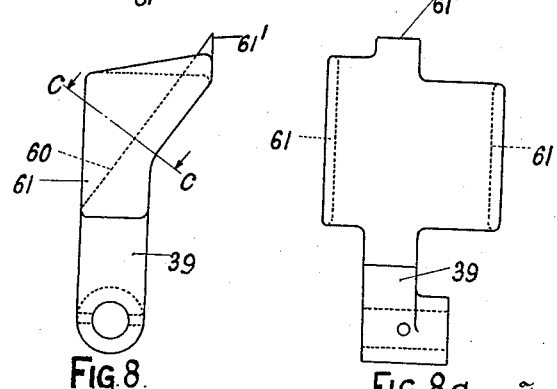

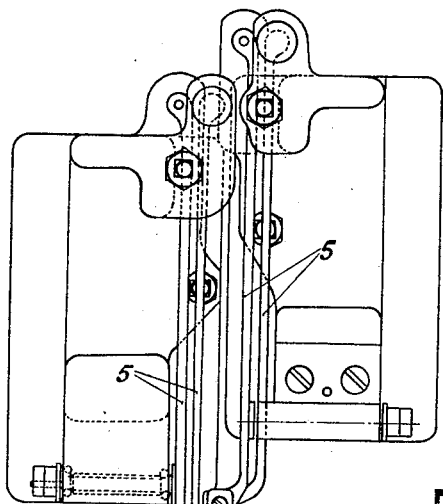
FIG. 10.
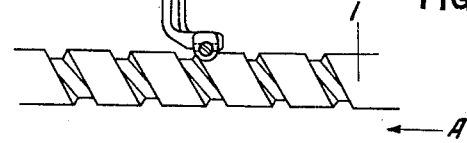
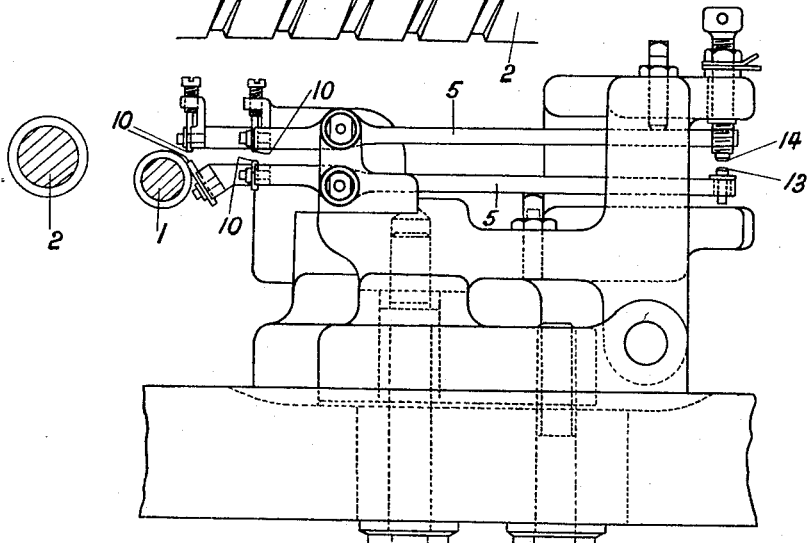
FIG. 11.
Inventors
William Tivendale
and James Baxter Patented May 9, 1933

1,908,197

UNITED STATES PATENT OFFICE

WILLIAM TIVENDALE, OF CLYDEBANK, AND JAMES BAXTER, OF GLASGOW, SCOTLAND, ASSIGNORS TO THE SINGER MANUFACTURING COMPANY, OF ELIZABETH, NEW JERSEY, A CORPORATION OF NEW JERSEY

DEVICE FOR SORTING NEEDLES AND THE LIKE

Application filed March 5, 1929, Serial No. 344,194, and in Great Britain March 6, 1928.

This invention relates to a device for sorting articles such as sewing machine needles, light wires and the like, being particularly applicable to the sorting of sewing machine needles which have been subjected to a straightening operation, whereby to separate articles which have been straightened in conformity with a predetermined standard from articles which are insufficiently straightened or do not conform with said standard.

The device of the invention may be self-contained or it may form a component or built-in part of a needle-straightening machine, for example of that type in which needles passing from a hopper are fed by two parallel rotating screws of opposite hand past one or more hammering stations, in which latter case the device of the present invention is located beyond the hammering station or the last hammering station.

The device of the invention comprises a detector located in proximity to the path of the needles and adapted to be shifted by a needle of abnormal eccentricity whereby to close a circuit through a magnet coil or solenoid which determines the movement of a shutter or the like controlling the entrances to chutes or the like, so that, depending on the position of the shutter, a needle which has passed the detector will enter one or other of the chutes.

In a preferred construction now to be described for sorting round shank needles which are rotated while being fed past the detector, the detector is constructed as a spring-loaded lever pivoted near the end adjacent to the needle path so as to magnify the motion at the opposite end where there is fitted an electrical contact co-operative with a stationary contact, and adapted when in engagement therewith to close a circuit through a rotary switch whereby to excite either one of two coils disposed in a line transverse to the needle path, it being understood that only when the detector is engaged by a needle of abnormal eccentricity is the circuit closed.

The rotary switch is mounted on a shaft carrying a cam engaged by followers on two stepped vibratory levers operating in a gate connected to the shutter aforesaid. Each lever is normally sustained by a roller on an arm carrying the armature of the relative coil, so that the lever vibrates idly. If and when either of the coils is excited and the armature attracted, the support for the relative lever is withdrawn and the lever lowered so that its stop is engageable with the gate; that is in its vibratory movement the lever vibrates the gate and operates the shutter.

In an adaptation of the invention for sorting flat shank needles which do not rotate when being fed to the sorting device, there are or may be provided a plurality of detectors located above and below the needle path.

Figure 1E:
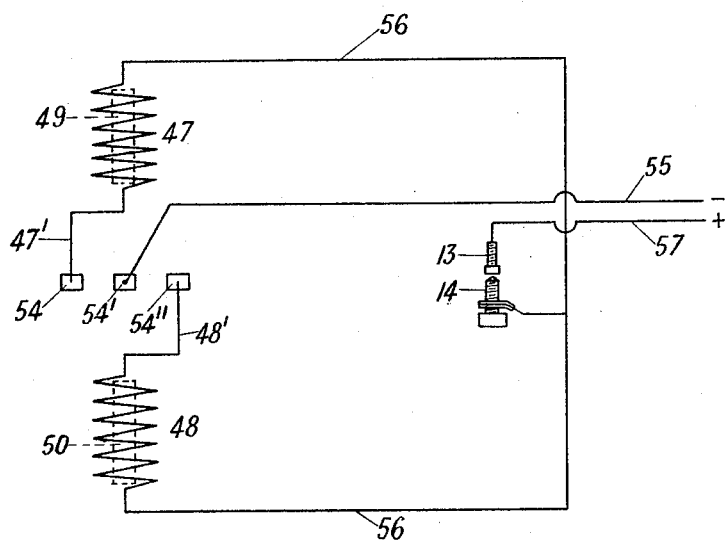

In the accompanying drawings Fig. 1 is a fragmentary plan view showing the delivery end of a needle-straightening machine fitted with a needle sorting device constructed in accordance with the invention; Fig. 1ª is a fragmentary plan view drawn to a larger scale than Fig. 1 and showing more clearly certain elements of the mechanism; Figs. 1ᵇ, 1ᶜ and 1ᵈ are sectional views, respectively on the lines 1ᵇ—1ᵇ, 1ᶜ—1ᶜ and 1ᵈ—1ᵈ of Fig. 1; Fig. 1ᵉ is a diagram of the electric circuit; Fig. 2 is a fragmentary side elevation showing the shutter operating mechanism; Fig. 3 is a view at right-angles to Fig. 2; Fig. 4 is a fragmentary end elevation showing the detector lever; Figs. 5 and 5ª are detail views of the cam; Figs. 6 and 6ª are detail views of the switch; Figs. 7, 7ª and 7ᵇ are detail views of the shutter operating lever; Figs. 8, 8ª, 8ᵇ and 8ᶜ are detail views of the shutter, Fig. 8ᶜ being a section on the line c—c of Fig. 8; and Fig. 9 is a diagrammatic view showing the position of the detector relatively to the needle path; Figs. 10 and 11 are, respectively, a fragmentary plan view and an elevation showing a modification adapted for sorting flat shank needles and incorporating four detector levers.

Throughout the several figures of the drawings reference characters, where repeated, indicate corresponding parts.

Referring to the construction shown in Figs. 1—9, 1 and 2 denote two parallel needle conveyor screws of opposite hand driven in opposite directions at equal speeds from a pulley 4 through a train of gearing indicated generally at 3 in manner substantially as described in the specification of Letters Patent 1,625,691 dated 19th April, 1927.

As is understood, the needles are advanced laterally by the conveyor screws 1, 2 in the direction indicated by the arrow A (Figs. 1, 1ª and 9) past one or more hammering stations towards the delivery end of the machine.

Disposed transversely of the screws 1 and 2, adjacent to the screw 1, is a light lever 5 pivoted between its ends on coaxially arranged pivot screws 6 threaded through standards 7 uprising from a bracket 8 sustained by the machine table 9. The short arm of the lever 5 i. e., the arm extending towards the screw 1, carries a vertically adjustable feeler tip 10 of which the lower edge 11 lies in close proximity to the path of the needles 12. 13 denotes an electrical contact carried on but insulated from the end of the other or long arm of the lever 5, said contact being, normally, in close proximity to but separated from a second electrical contact 14 threaded through the bracket 8. Uprising from the bracket 8 is a lug 15 through the upper part of which is threaded an adjusting screw 16 the lower end of which engages the long arm of the lever 5. Integral with the bracket 8, adjacent to the lug 15, is a bifurcated guide member 17 embracing the lever.

The adjacent ends of the pivot screws 6 engage indentations formed in the ends of a shouldered pin 18 penetrating the lever 5 and clamped thereto by a nut 19. The pin 18 is embraced by a light torsion spring 20 anchored at one end to the lever and at the other end to the adjacent standard 7, said spring urging the lever 5 in the direction to maintain the contact 13 apart from the cooperating contact 14, upward movement of the long arm of the lever being limited by the adjusting screw 16.

Disposed adjacent to and parallel with the conveyor screw 2 is a shaft 21 journalled in a bush 22 mounted in a bracket 23 fixed to the table 9. One end of said shaft 21 overhangs the table 9 and carries a gear 24 driven from one member of the train 3, the arrangement being such that the shaft 21 is rotated at half the speed of the screws 1 and 2. The other end of the shaft 21 carries a cam 25 (see particularly Figs. 5 and 5ª) and adjacent thereto a rotary switch member 26 (see particularly Figs. 6 and 6ª). The groove 27 of the cam 25 is engaged by followers 28, 28 carried by two vibratory levers 29, 29 arranged one on each side of the cam and pivotally connected at 30 at their lower ends to the bracket 23. Pivotally connected at 31 to the upper ends of the levers 29 are bell-crank pusher levers each having arms 32, 33 of which the arms 33 lie substantially horizontally with their ends engaging slots 34, 34 constituting a gate formed in the upper end of a shutter operating lever 35 secured at its lower end to a spindle 36 journalled in a lug 37 integral with and depending from the bracket 23. The lower end faces of the arms 33 engaging the slots 34 are stepped at 40. 35' denotes a helical compression spring interposed between the rear face of the lever 35 and an abutment 35'' and urging said lever against an abutment face 23' formed on the bracket 23. The lug 37 projects downwardly through an opening 38 formed in the table 9 beneath the bracket 23. Secured to the end of the spindle 36 remote from the lever 35 is a shutter 39 hereinafter described and extending upwardly beneath the conveyor screws 1, 2. Adjusting screws 41, 41 threaded through lugs 42, 42 integral with the bracket 23 cooperate with the depending arms 32 of the pusher levers 33, 33. The lower edges of the arms 33 normally ride on rollers 43, carried on the inner faces of the upper ends of levers 44, pivoted at their lower ends on pins 45, penetrating lugs formed on the bracket 23. Fixed to the levers 44 beneath the rollers 43 are soft iron armatures 46 one on each lever on the outer face thereof. The levers 44 are interconnected by a helical tension spring 44' which maintains the levers in vertical position with the rollers 43 sustaining the arms 33.

47, 48 denote spaced coaxial magnet coils disposed transversely of and below the screws 1, 2, said coils having cores 49, 50, respectively, carried by lugs 51, 52 uprising from the bracket 23. The cores 49, 50 and the armatures 46, 46 are collinear, the inner end faces of said cores being located in close proximity to the armatures 46.

Disposed directly beneath the switch member 26 are three brush holders 53 fitted with spring-urged brushes 54, 54', 54'' cooperating with the switch member 26. A conductor 55 connects the central brush 54' to one of a pair of electric current supply leads E (Figs. 1 and 1ª). The brush 54 is connected to one end 47' of the coil 47. The brush 54'' is connected to one end 48' of the coil 48. The remaining ends of the coils 47, 48 are connected by conductors 56 to the contact 14. The contact 13 on the lever 5 is connected by a conductor 57 to the other electric current supply lead E (Fig. 1).

The switch member 26 (Figs. 6 and 6ª) includes a cylindrical body of insulating material carrying opposed arcuate metallic segments 58, 59, one segment being displaced axially of the body 26 relatively to the other segment, the relative axial displacement of the segments being such that, in the rotation of the switch member 26, the central brush 54' is engaged alternately by the segments while the brushes 54 and 54″ cooperate, respectively, with the segments 58, 59.

The shutter (see particularly Figs. 8—8c) includes an arm 39 of which the lower end is apertured for fixing to the spindle 36. The upper end of the arm presents an inclined face 60 defining with side walls 61 a chute of channel section. 61′ denotes an upwardly extending finger formed on the upper edge of the chute and located between the conveyor screws 1, 2, the upper edge of said finger extending slightly above the axis of the screw 1 as shown in Fig. 3.

62 denotes the needle shank rest of the machine intermediate the screws 1, 2 said rest terminating at 63 a slight distance beyond the feeler tip 10.

In operation, the needles 12 are advanced laterally by the conveyor screws 1, 2 past the detector lever 5 towards the end 63 of the needle shank rest 62 at which point they drop under gravity through the opening 38 in the table 9. In the embodiment illustrated the needles are rotated axially during their lateral movement. When a needle which has not been straightened in conformity with a predetermined standard is being traversed past the detector lever 5, the lower edge 11 of the feeler tip 10 thereon is forcibly engaged by the needle blade and the lever is rocked on its pivots 6 whereby the contact 13 is caused to engage the contact 14, the movement of the feeler tip being magnified at the contact end of the lever. At this instant one or other of the switch segments is in contact with the relative brush; say the segment 58 is in contact with its brush 54. The electrical circuit to the coil 47 is thus completed and the corresponding armature 46 attracted whereby the sustaining roller 43 of the corresponding lever 32, 33 is withdrawn laterally from beneath the arm 33 of the lever, permitting the step 40 of said lever in the forward movement of the lever to engage the lower boundary of the corresponding slot 34 in the lever 35, it being understood that the levers 29 and 32, 33 are being vibrated out of phase by the rotating cam 25. Forward movement is thus imparted to the shutter operating lever 35 in opposition to the stress of the spring 35′. Rocking movement imparted to the lever 35 is transmitted through the spindle 36 to the shutter 39 which is rocked towards the end 63 of the needle shank rest 62 whereby the defective needle about to drop therefrom is caught by the finger 61′ of the shutter and deflected down the inclined face 60 into a chute 64 disposed below the table 9 and distinct from another chute 65 adjacent thereto which is contrived to receive the needles which have been straightened in conformity with a predetermined standard.

In the retiring movement of the pusher lever 32, 33 the lever 35 and the shutter 39 are restored to initial position by the spring 35′, the lever arm 33 being raised slightly when the other arm 32 of the lever engages the corresponding pin 41, the rising movement of the arm 33 permitting the corresponding armature-carrying lever 44, under the action of the spring 44′, to move inwardly, whereby the roller 43 thereon is restored to initial position to sustain the arm 33.

It will be understood that the circuit through the coil 47 is closed only during the period of the traverse of the defective needle past the feeler tip 10. If the succeeding needle is also defective, the detector lever 5 is again rocked but in this case the circuit through the other coil 48 is closed, the other switch segment 59 being in contact with the other brush 54″. The armature carrying lever cooperating with the coil 48 is actuated and the sequence of operations repeated.

A straight needle, i. e., a needle which has been straightened in conformity with a predetermined standard, does not actuate the detector lever 5 to effect engagement of the contacts 13, 14, such needle dropping directly under gravity from the end 63 of the shank rest 62 into the second mentioned chute 65.

By reference to Fig. 9 it will be seen that, as a needle drops from the end 63 of the shank rest 62, the succeeding needle enters into engagement with the feeler tip 10.

The sorting device of the invention need not be used in conjunction with a needle straightening machine but may be associated with a needle feeding hopper and conveyor screws to constitute a needle inspection unit separate from the needle straightening machine.

In the modification shown in Figs. 10 and 11 for sorting flat shank needles which are not rotated while being fed to the sorting device there are provided four spring-loaded detector levers 5 each carrying a feeler tip 10. The levers are so arranged that two feelers 10 are located above and two below the needle path, an upper feeler and a lower feeler being in vertical register adjacent to the screw 1 so as to be engageable by that part of the needle blade adjacent to the needle shank and the other pair of feelers being in vertical register and spaced from the first mentioned pair so as to be engageable by that portion of the needle blade near the point. Each lever 5 carries on its end remote from the feeler tip 10 an electrical contact 13 normally in close proximity to but separated from a second stationary electrical contact 14.

The four lever contacts 13 are connected to one another and to one of the current supply leads E by the conductor 57. The four stationary contacts 14 are connected to one another and to the conductors 56 leading to the coils 47, 48, the other electrical connections being in accordance with Figs. 1, 1a and 1c.

In operation, when a needle which has not been straightened in conformity with a predetermined standard traverses the feelers 10, one or other of the levers 5 is rocked on its pivot so that the corresponding contacts 13, 14 are closed and one or other of the coils 47, 48 is excited to effect operation of the shutter 39 to deflect the defective needle into the chute 64.

What we claim is:—

1. A sorting device for separating articles straight to a given standard from articles which do not conform with said standard, comprising means for conveying the articles, a contact, coils, a rotary switch comprising alternately active contacts, electrically conducting means for connecting said contact, coils and switch, a detector located in proximity to the path of the articles and adapted to be displaced by an article of abnormal departure from standard, a contact movable by said detector and engageable with said first contact, a shaft carrying said switch, said switch contacts angularly displaced on said shaft, a cam on said shaft, means operatively connected with said conveying means for rotating said shaft, a shutter determining the path of articles which have passed beyond said detector, a gate connected to said shutter, normally idle vibratory levers operating in said gate, said levers deriving vibratory movements from said cam, and means co-operative with said coils whereby on excitation of one of said coils one of said levers is caused to engage said gate and thereby to actuate said shutter.

2. A sorting device for separating articles straight to a given standard from articles which do not conform with said standard, comprising means for conveying the articles, a contact, coils, a rotary switch comprising alternately active contacts, electrically conducting means for connecting said contact, coils and switch, a detector located in proximity to the path of the articles and adapted to be displaced by an article of abnormal departure from standard, a contact movable by said detector and engageable with said first contact, a shaft carrying said switch, said switch contacts angularly displaced on said shaft, a cam on said shaft, means operatively connected with said conveying means for rotating said shaft, a shutter determining the path of articles which have passed beyond said detector, a gate connected to said shutter, pushers operating in said gate, said pushers deriving vibratory movements from said cam, supports normally sustaining said levers in non-engaging relation with said gate, and armatures influenced by said coils and connected to said supports, whereby on excitation of one of said coils one of said supports is withdrawn from its lever to cause said lever to engage said gate and thereby to actuate said shutter.

3. A sorting device for separating articles straight to a given standard from articles which do not conform with said standard, comprising rotatable screws for conveying the articles laterally, means for rotating said screws, a detector located in proximity to the path of the articles and adapted to be displaced by an article of abnormal departure from standard, a movable chute extending between said screws, a train operatively connected to said screw rotating means and including a vibratory member and means dependent for operation on displacement of said detector for coupling said vibratory member with said chute whereby to position said chute to receive an article which has displaced said detector.

4. A sorting device for separating needles, light wires and like articles which are straight to a given standard from similar articles which do not conform with said standard, comprising rotatable screws for conveying the articles laterally, means for rotating said screws, an article-supporting rest terminating between said screws, a movable crooked-article detector positioned with respect to said rest for displacement by an article of abnormal departure from standard, a shutter movable toward and from the end of said rest, and detector-influenced means for actuating said shutter.

5. A sorting device for separating needles, light wires and like articles which are straight to a given standard from similar articles which do not conform with said standard, comprising rotatable screws for conveying the articles laterally, means for rotating said screws, an article-supporting rest terminating between said screws, a crooked-article detector disposed within a pitch length of said screws in advance of the end of said rest, a crooked-article deflector movable toward and from the end of said rest, and detector-influenced means for actuating said deflector.

6. A sorting device for separating needles, light wires and like articles which are straight to a given standard from similar articles which do not conform with said standard, comprising rotatable screws for conveying the articles laterally, means for rotating said screws, an article-supporting rest terminating between said screws, a crooked-article detector, a shutter movable in directions toward and from the end of said rest, and detector-influenced means effective to move said shutter in one of said directions within the time of one complete rotation of said conveyor-screws.

7. A sorting device for separating needles, light wires and like articles which are straight to a given standard from similar articles which do not conform with said standard, comprising rotatable screws for conveying the articles laterally, means for rotating said screws, a crooked-article detector disposed in proximity to the path of the articles, a movable crooked-article deflector having an article-deflecting position spaced beyond said detector a distance within the length of the pitch of said conveyor screws, and detector-influenced means for actuating said deflector.

8. A sorting device for separating articles straight to a given standard from articles which do not conform with said standard, comprising rotatable screws for conveying the articles laterally, means for rotating said screws, an article-supporting rest terminating between said screws, a detector located in proximity to the path of the articles and adapted to be displaced by an article of abnormal departure from standard, an electric circuit adapted to be closed or left open depending on the displacement of said detector, a shutter disposed between said screws and movable toward and from the end of said rest to determine the path of articles which have passed beyond the detector, and shutter-actuating means dependent for operation on the closed or open condition of said circuit.

9. A sorting device for separating needles, light wires and like articles which are straight to a given standard from similar articles which do not conform with said standard, comprising rotatable screws for conveying the articles laterally, means for rotating said screws, a crooked-article detector, a movable crooked-article deflector, and detector-influenced means adapted to actuate said deflector in the same direction once for each complete rotation of said article-conveying screws.

10. In a needle-sorting machine, a needle-conveyor, a crooked-needle detector, a shutter toward which the needles are conveyed after passing the detector, a plurality of normally ineffective shutter-actuating devices, means for idly operating said shutter-actuating devices in differentially timed relationship, and detector-influenced means adapted to render one or the other of said devices effective to move said shutter.

11. A sorting device for separating needles, light wires and like articles which are straight to a given standard from similar articles which do not conform with said standard, comprising rotatable screws for conveying the articles laterally, means for rotating said screws, a crooked-article detector, a movable crooked-article deflector, a plurality of normally ineffective deflector-actuating devices, means for actuating each of said devices in the same direction once for each complete rotation of said screws, and detector-influenced means adapted to render said deflector-actuating devices effective.

12. A sorting device for separating needles, light wires and like articles which are straight to a given standard from similar articles which do not conform with said standard, comprising rotatable screws for conveying the articles laterally, means for rotating said screws, a crooked-article detector, a movable crooked-article deflector, a plurality of normally ineffective deflector-actuating devices, a rotary cam operating each of said devices in the same direction once for each complete rotation of said screws, means for rotating said cam at one half the speed of rotation of said conveyor screws, and detector-influenced means adapted to render said deflector-actuating devices effective.

13. A sorting device for separating needles, light wires and like articles which are straight to a given standard from similar articles which do not conform with said standard, comprising means for successively conveying the articles laterally in substantially parallel relationship, a detector located in proximity to the path of the articles and adapted to be displaced by an article of abnormal departure from standard, a movable shutter governing the path of an article which has passed beyond the detector, a plurality of shutter-controlling members adapted to determine the same article-path governing position of said shutter, and means influenced by said detector adapted to render said controlling members alternately effective.

14. A sorting device for separating needles, light wires and like articles which are straight to a given standard from similar articles which do not conform with said standard, comprising article-conveying means, a crooked-article detector, a shutter toward which the articles are conveyed after passing the detector, a plurality of normally ineffective pushers adapted to move said shutter in the same direction, an actuating element operating in timed relation with respect to said article-conveying means reciprocating said pushers in out-of-phase relationship, means for supporting said pushers in idly reciprocating position, and detector influenced means adapted to alternately shift said pusher-supporting means and thereby render said pushers alternately effective to move said shutter.

15. A sorting device for separating needles, light wires and like articles which are straight to a given standard from similar articles which do not conform with said standard, comprising rotatable screws for conveying the articles laterally, means for rotating said screws, an article-supporting rest terminating between said screws, a detector located in proximity to the path of the articles and adapted to be displaced by an article of abnormal departure from standard, a shutter disposed between said screws and movable toward and from the end of said rest to determine the path of articles which have passed beyond the detector, a reciprocatory pusher normally ineffective to actuate said shutter, means for reciprocating said pusher, and detector-influenced means rendering said pusher effective to move said shutter.

16. A sorting device for separating needles, light wires and like articles which are straight to a given standard from similar articles which do not conform with said standard, comprising uninterruptedly acting means for conveying the articles, a detector located in proximity to the path of the articles and adapted to be displaced by an article of abnormal departure from standard, a shutter for determining the path of articles which have passed beyond the detector, a gate operatively connected to said shutter, a pair of gate-operating pushers normally ineffective to actuate said gate, means for reciprocating said pushers, and means controlled by said detector adapted to render said pushers alternately effective to actuate said gate in the same direction to thereby determine one position of said shutter.

In testimony whereof we have signed our names to this specification.

WILLIAM TIVENDALE.
JAMES BAXTER.